United States Patent [19]

Horsch

[11] 4,046,160
[45] Sept. 6, 1977

[54] TRANSMISSION CLUTCHES WITH SEQUENCE VALVE AND PISTON-CONTROLLED PRESSURE MODULATOR

[75] Inventor: Joachim Horsch, Lombard, Ill.

[73] Assignee: International Harvester Company, Chicago, Ill.

[21] Appl. No.: 654,427

[22] Filed: Feb. 2, 1976

[51] Int. Cl.² .................... B60K 41/00; F16D 25/11
[52] U.S. Cl. .................................. 137/115; 137/118; 137/625.3; 192/3.57; 192/87.13; 192/87.18; 192/109 F
[58] Field of Search ............... 72/753, 754; 91/407; 137/115, 118, 116.3, 625.12, 625.3; 192/3.57, 87.13, 87.18, 87.19, 109 F

[56] References Cited

U.S. PATENT DOCUMENTS

| | | | |
|---|---|---|---|
| 2,796,879 | 6/1957 | Jacobson et al. | 136/115 X |
| 2,935,999 | 5/1960 | Hock et al. | 192/109 F X |
| 3,181,394 | 5/1965 | Ramsel et al. | 74/753 X |
| 3,307,568 | 3/1967 | Gartner | 137/115 |
| 3,468,194 | 9/1969 | Horsch et al. | 192/87.19 X |
| 3,550,507 | 12/1970 | Schott | 192/87.13 X |
| 3,597,010 | 8/1971 | Berman | 137/115 X |
| 3,640,360 | 2/1972 | Dollase | 192/109 F X |
| 3,752,188 | 8/1973 | Sage | 137/625.12 |
| 3,882,980 | 5/1975 | Blake | 192/3.57 |
| 3,946,760 | 3/1976 | Murakami et al. | 192/109 F X |
| 3,991,865 | 11/1976 | Komatsu | 137/116.3 X |

Primary Examiner—Benjamin W. Wyche
Assistant Examiner—Carl F. Pietruszka
Attorney, Agent, or Firm—John W. Gaines; Floyd B. Harman

[57] ABSTRACT

Hydraulic controls in a transmission for engaging a clutch for the F-R, or forward or reverse, direction before a clutch for first, second, or third speed. Flow of hydraulic fluid to each direction clutch and to each speed clutch is by way of a reducing valve which modulates fluid pressure in controlled way by throttling the flow. After the power unit for the clutch for the F-R clutches and the power unit for the clutch for first, second or third speed are filled with fluid by the reducing valve, pressure in the power units is then slowly raised by the valve linearly toward is maximum; for this purpose the hydraulic controls are supplied by a single source of hydraulic fluid and operate therefrom to provide a pair of modulated pressure outputs which are maintained with varying differences throughout their range of operation, and which operate the selected one of the F-R clutches and the selected one of the first second or third clutches. The F-R clutches are the ones which receive the higher modulated pressure output and which are constructed, proportioned in size, and arranged to have a higher speed capability and smaller energy absorbing capacity in their design, and they operate so as to be fully hydraulically engaged at the higher pressure output, and hence slightly before, the speed clutches.

4 Claims, 11 Drawing Figures

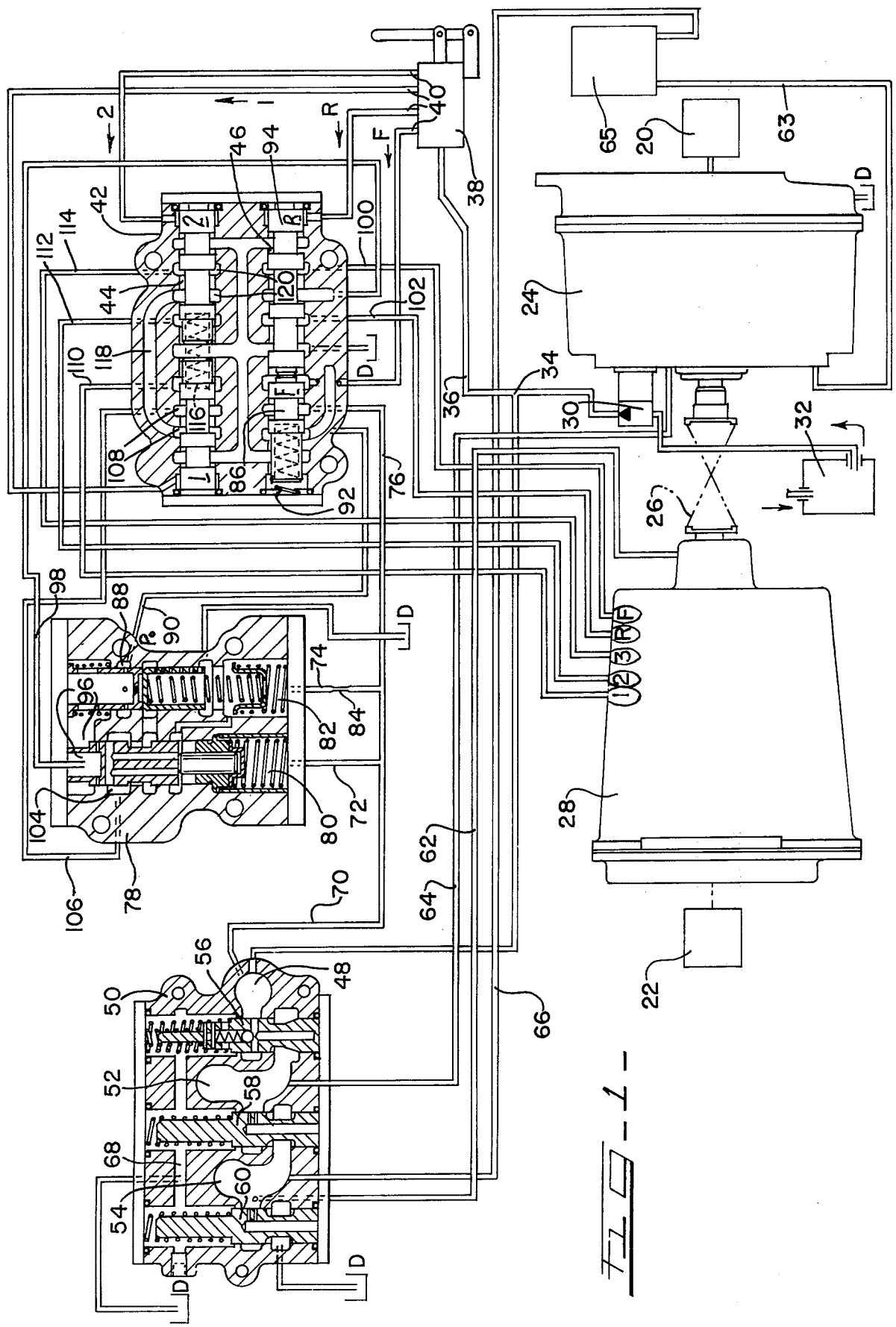

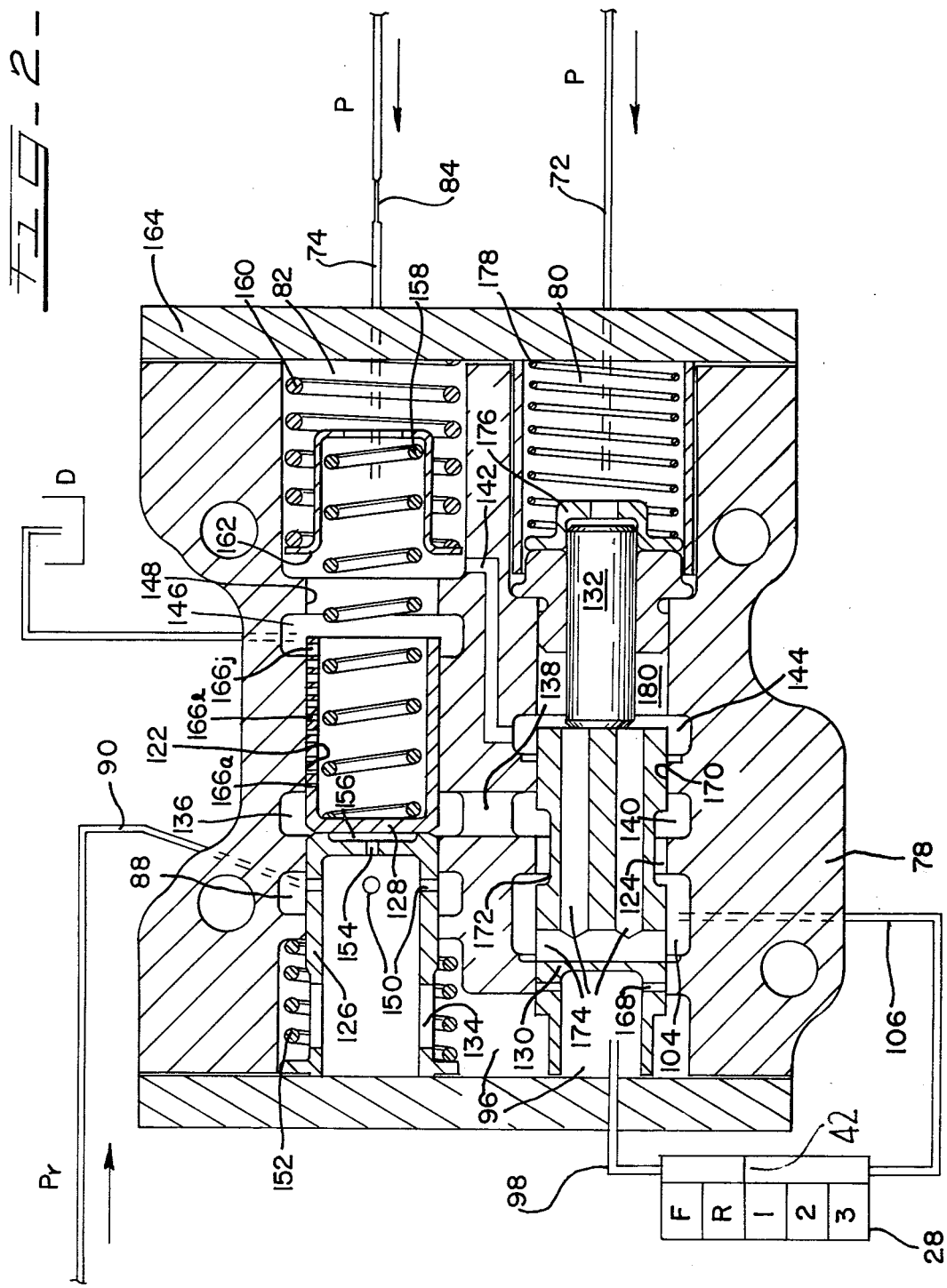

FIG-3-
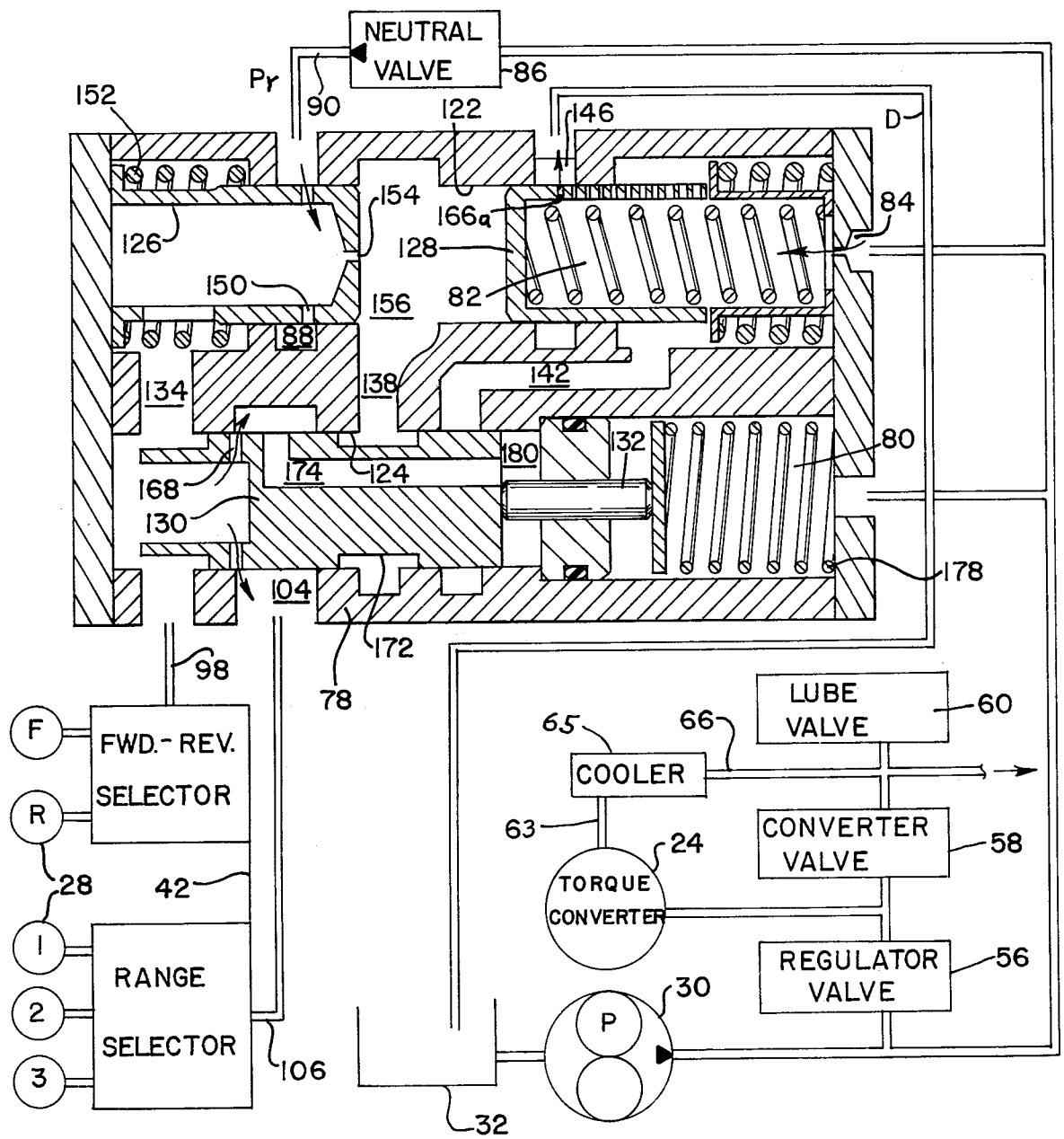

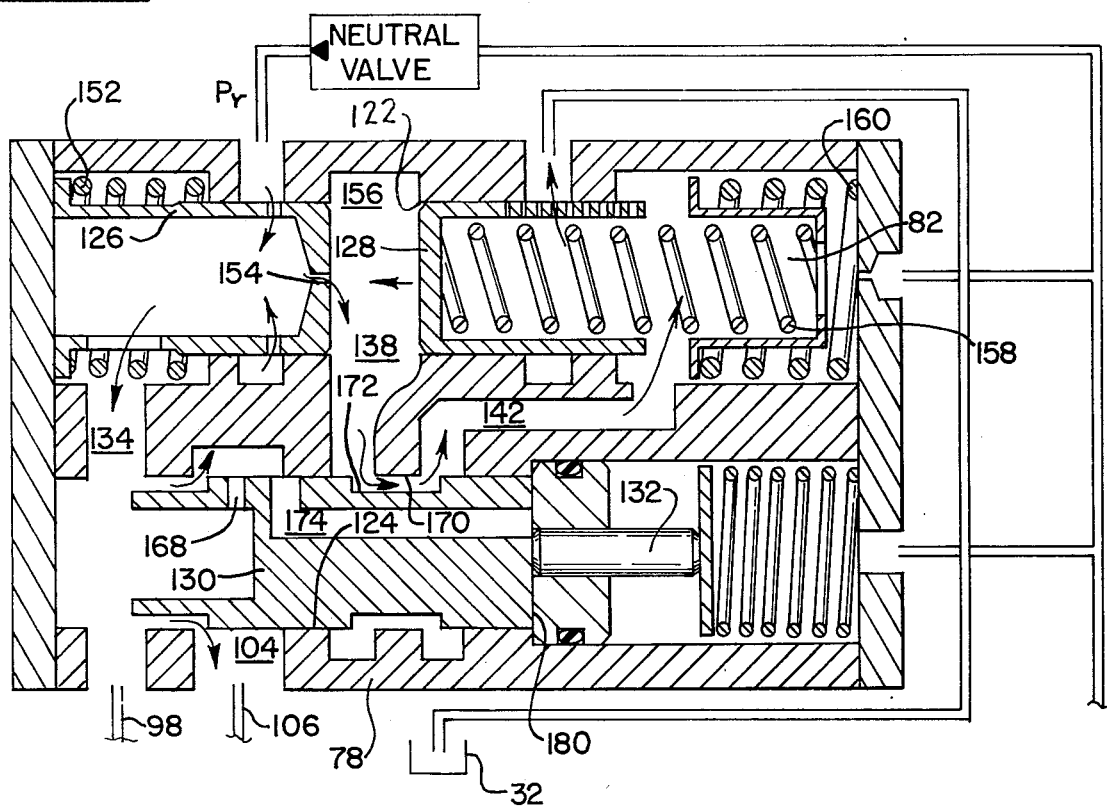
FIG-4-
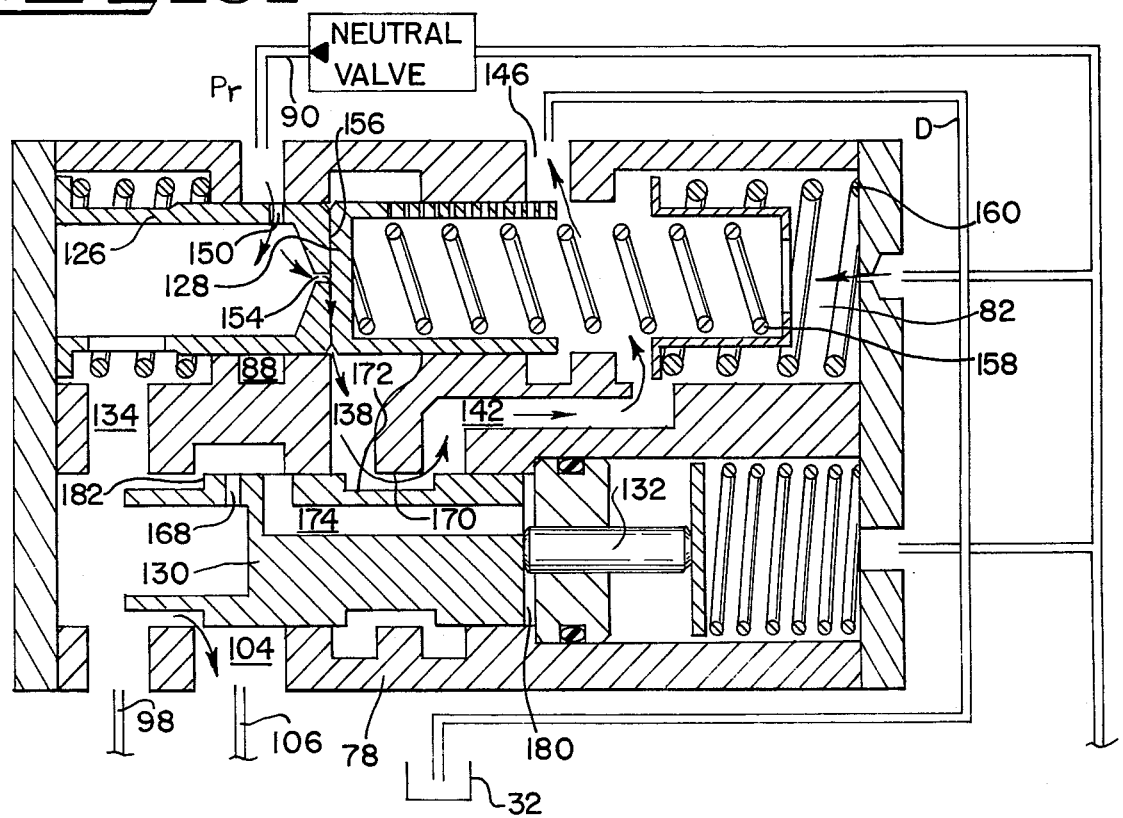
FIG-5-

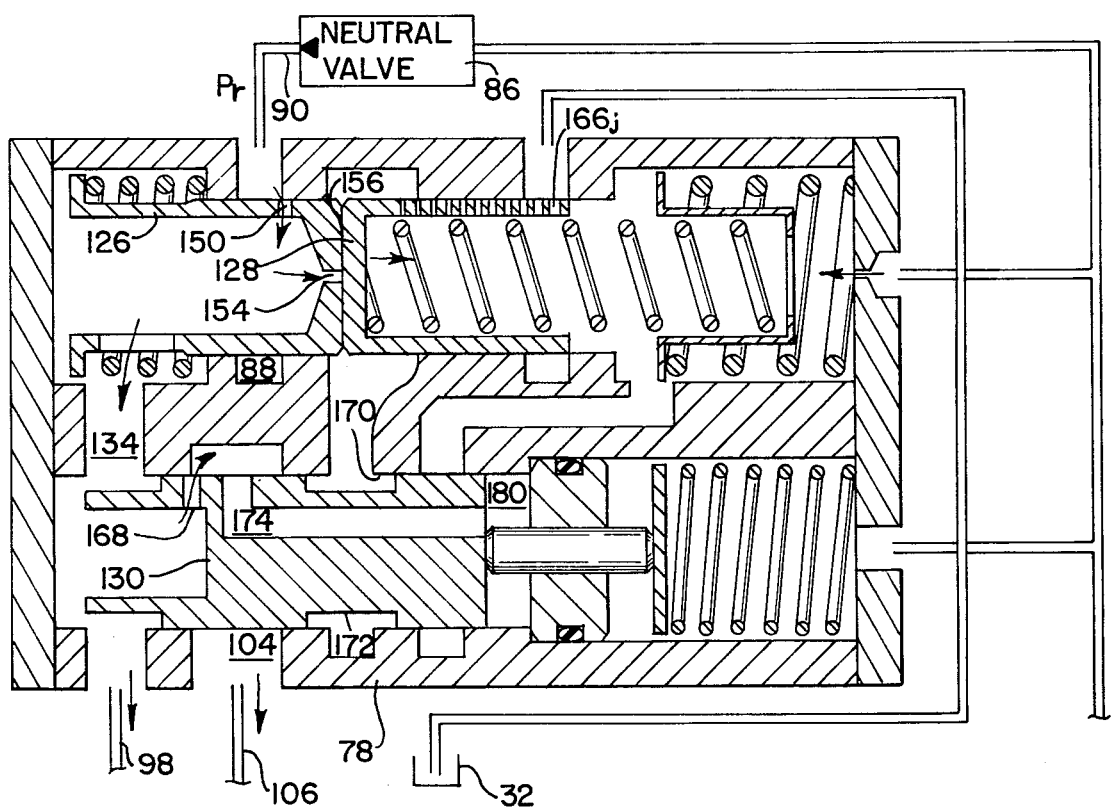
FIG-6-
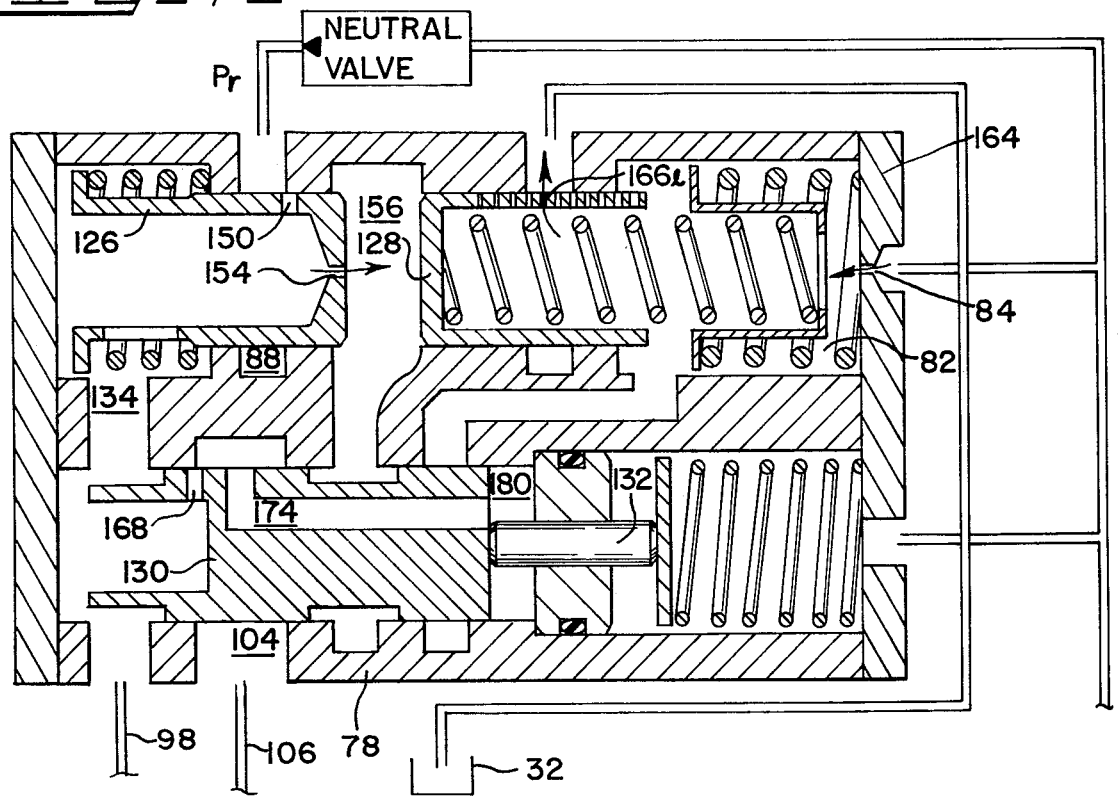
FIG-7-

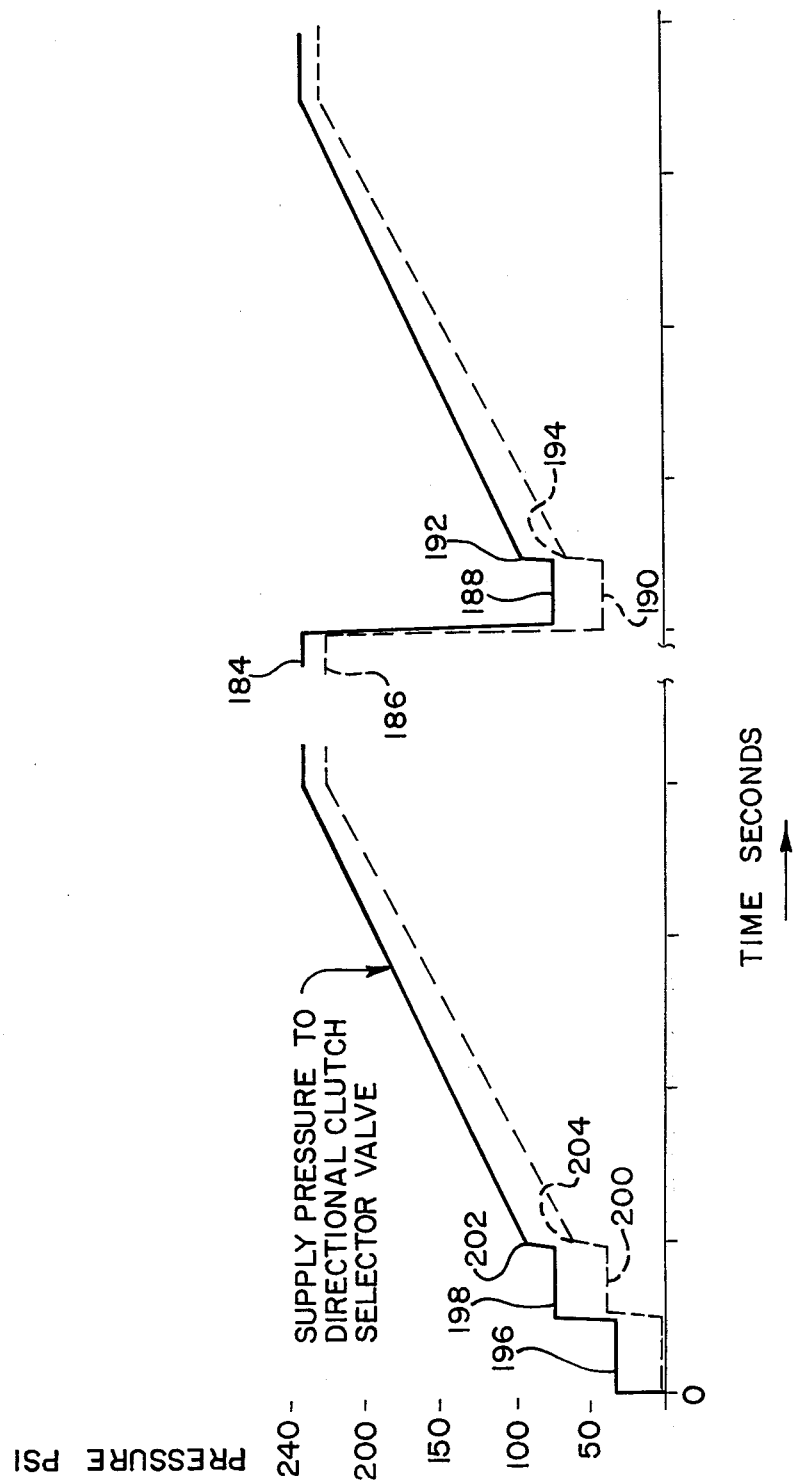

TRANSMISSION CLUTCHES WITH SEQUENCE VALVE AND PISTON-CONTROLLED PRESSURE MODULATOR

This invention relates to the control of hydraulic fluid for operating the power units for the clutches of an automotive transmission. More specifically, the invention relates to scheduled actuation of power units for clutches in a sequence in a power shift transmission of a tractor. In accordance with the practice in tractor operation it is desirable to set a control both for speed and for direction at the same time, and thereafter automatically control the clutches for first, second, and third speed from the same hydraulic circuit as for forward and reverse. Yet, in one example hereinafter given, the direction clutch should be fully engaged before the speed clutch, all while the tractor continues undisturbed at its operating speed, and the speed clutch should then go undergo engagement while the tractor engine still continues at the operating speed.

U.S. Pat. No. 3,799,308, owned by the same assignee, discloses a reducing or scheduling valve for a vehicle transmission generally in line with the foregoing practice. One improvement disclosed by the patent is concerned with feedback-pressure-operated scheduling valve means which slowly raises pressure linearly toward its maximum in the pair of clutch systems or groups, the slowness of rate depending upon the clutches selected and differing from clutch to clutch in the pair of clutch groups. The full disclosure thereof relating to the vehicle, transmission, clutches, engine, and other components of a power drive train are exemplary hereof and are specfically incorporated in the present application by reference.

The present application concerns itself with a different improvement, in respect of a pair of modulated pressure outputs and the pair of clutch groups requiring hydraulic pressures of different characteristics from such modulated pressure outputs.

The present pair of modulated pressure outputs are, for achieving better control and operation, maintained with varying differences throughout their range of operation, as will now be explained. Various features, objects, and advantages will either be specifically pointed out or become apparent when, for a better understanding of the invention, reference is made to the following description taken in conjunction with the accompanying drawings, which show a preferred embodiment thereof and in which:

FIG. 1 is an hydraulic controls diagram of a tractor power shift hydraulic transmission, including a sequence valve in the controls having a piston-controlled pressure modulator;

FIG. 2 is an enlarged showing of the sequence valve and piston-controlled pressure modulator of FIG. 1;

FIGS. 3, 4, 5, 6, 7, 8 and 9 are schematic showings of the sequence valve and piston-controlled pressure modulator in various operating positions; and FIGS. 10 and 11 are graphs of pressure traces representing the pressure to the direction and speed clutches, respectively during a speed clutch shift and during a directional clutch shift.

Figure 8:
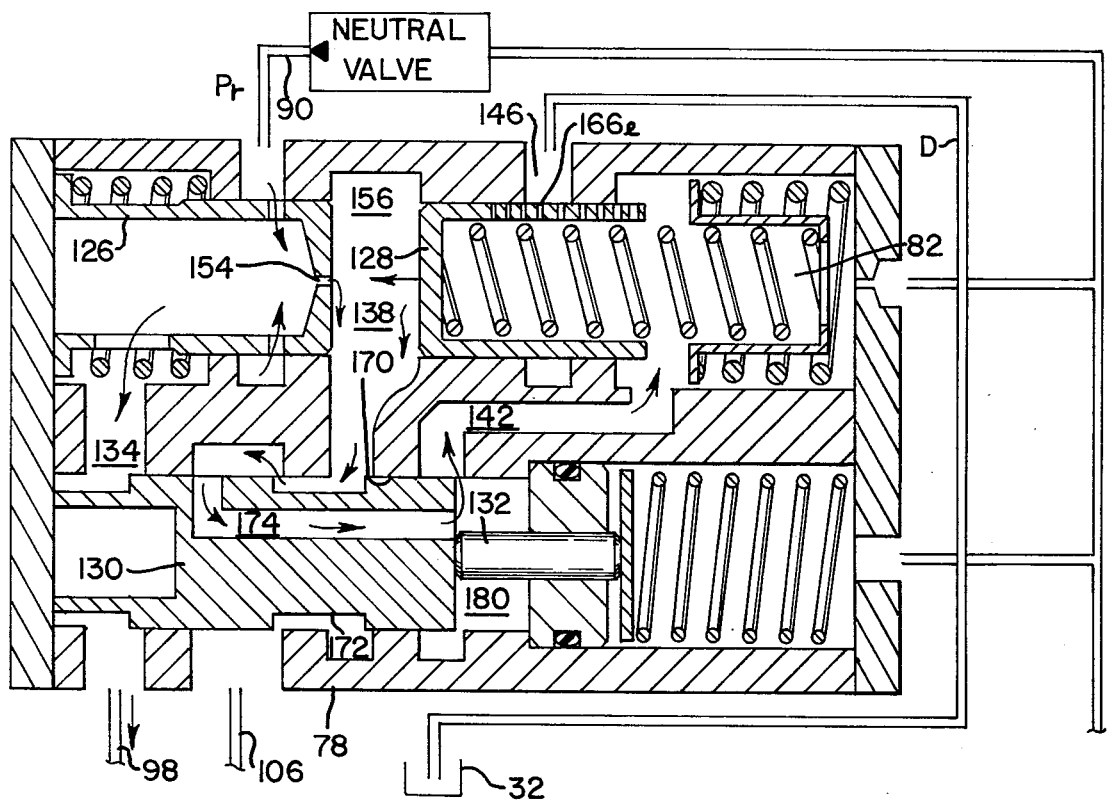

From a tractor engine 20 illustrated in FIG. 1 of the drawings, the power train to the traction drive apparatus 22 of the tractor includes an hydraulic torque amplifier or converter 24, a transmission input shaft 26, and a three-speed power shift transmission 28, in that order. The transmission 28 is a conventional one, and can be basically of the type generally as shown in U.S. Pat. Nos. 3,374,681; 3,400,601; 3,566,716; 3,606,906; and 3,799,308 owned by the same assignee, which controlled clutch patents disclose a forward section of two direction clutches and an output section of three speed clutches, and the disclosures of which controlled clutch patents are incorporated in entirety herein by reference. Although not illustrated, it will be understood in the power path that the two direction clutches have low energy capacity and they are engaged first; however, the two direction clutches have relatively high torque capacity, to wit, approximately double the capacity of the speed clutches at the outset of engagement but nearly equal torque capacity thereto at the engaging point of the respective direction and speed clutches. In distinction, the cooperating three speed clutches are each a high energy absorbing clutch with lots of clutch area, so as to be able to take lots of slippage and dissipate a high amount of heat, and so as to be properly engageable last in each shift.

The unillustrated clutches referred to in the transmission 28 are fluid operated by hydraulic power cylinder units designated in FIG. 1 as F, R, 1, 2, and 3. The clutch cylinders of the pair of groups are so actuated that only one clutch in the F R group of the forward section and only one clutch in the 1 2 3 group of the output section are selected at the same time, causing only one speed clutch to engage and only one direction clutch to engage for a given tractor drive speed and direction.

Further in connection with FIG. 1, a high pressure pump 30 drawing from a pump source 32 and driven by the torque converter 24 is seen to supply hydraulic fluid under rail pressure to a conduit junction 34 which divides into branch flow and main flow. Branch flow leads in a path through a branch 36, a pilot valve 38, signal lines 40, thence into a range selector valve 42 having four spools disposed in upper and lower bores 44 and 46 and hydraulically controlled at the respective upper pressure signal points 1 and 2 and the lower pressure signal points F and R.

The main flow leads from the conduit junction 34 into the main rail gallery 48 of a three stage regulator 50 which splits the flow in two paths. One path from the gallery 48 leads through consecutive chambers for converters oil at 52 and for lube oil at 54, thence into drain D.

The converter chamber 52 and main gallery 48 have an interposed rail regulator valve 56 maintaining rail pressure at, for example 260 psi; the lube chamber and converter chamber 54 and 52 have an interposed converter regulator valve 58 maintaining the converter chamber 52 at, for example, 120 psi; and the drain D and lube chamber 54 have an interposed lube regulator valve 60 maintaining the lube chamber 54 at about 50 psi as compared to the 0 psi maintained in the drain D.

Hydraulic fluid at lube pressure passes from the lube chamber 54 for a variety of uses, e.g., passing therefrom through a line 62 connected to the transmission 28 for lubricating same under pressure. Hydraulic fluid at converter pressure passes from the converter chamber 52 through a converter line 64 to the torque converter 24 whereafter, following its passage through a cooler supply line 63 and a converter cooler 65, the fluid is returned at lower pressure through a cooler return line 66 to the lube chamber 54 to supplement the 50 psi lube oil being used in the system. A valve leakage gallery 68 in the pressure regulator 50 communicates leakage past the three valves 56, 58, and 60 to drain D.

The other gallery path from main rail gallery 48 leads through a conduit 70 which splits into a first branch 72, a second branch 74, and a third branch 76, all associated directly or indirectly with a rate-of-rise valve assembly 78. The first branch 72 feeds, into a first reference chamber 80 of the assembly 78, the rail pressure to serve as a constant reference pressure 260 psi. The second branch 74 feeds hydraulic fluid into a second variable reference pressure chamber 82 via a pressure-dropping restriction 84 in the branch 74. The third branch 76 feeds rail pressure fluid to a neutral valve 86 located in the bore 46 of the range selector valve assembly 42, for transmission or not by the neutral valve 86 into a rail pressure inlet 88 in assembly 78 via a neutral valve line 90.

In range selector valve assembly 42, the neutral valve 86 in the lower bore 46 is directly hydraulically responsive to a forward pressure signal F from the appropriate one of the signal lines 40 so as to overcome a neutral valve spring 92 and open the inlet 88 to direct rail pressure. The valve 86 is directly mechanically responsive in bore 46 to opening from the tandem valve spool 94 which hydraulically moves from reverse signal pressure at point R so as to shift the spool 94 and valve 86 simultaneously to the left as viewed in FIG. 1.

In the rate of rise assembly 78 a direction chamber 96 communicates fill and modulating pressure to the direction clutches in a path leading through a conduit 98, the spool 94 and grooves in lower bore 46 of the assembly 42, thence through F and R conduits 100 and 102 into the forward and reverse clutch cylinders F and R. The spool 94 makes the appropriate selection in response to either a signal at the F pressure point or at the R pressure point in bore 46. A speed chamber 104 communicates fill and modulating pressure to the speed clutches in a path leading through a speed conduit 106, appropriate grooves 108 and valve spools responsive to pressure at pressure points 1 and 2 in the upper bore 44, thence through conduits 110, 112 and 114 for communicating pressure signals 1, 2, or 3 into the hydraulic clutch cylinders 1, 2, and 3 in the output section of transmission 28. The spool in bore 44 responsive to first speed pressure at point 1 moves to the right as viewed in FIG. 1 so as to collapse a spring 116 and actuate the first speed clutch cylinder. When the spool responsive to pressure at point 2 moves to the left so as to collapse the spring 116, it actuates the second speed clutch cylinder in transmission 28. On the other hand, when both spools take the unmoved position as shown in FIG. 1, the third speed conduit 114 is pressurized in a path leading from the grooves 108 cored in the bore 44, thence through a longitudinal passage 118, through further grooves 120 and a portion of the bore 44, thence into the third speed clutch cylinder via the just mentioned conduit 114.

SPEED AND RANGE SELECTION

Appropriate operation of the pilot valve 38 causes initiating signals which are four in number to provide seven settings of the transmission 28. The presence or absence of signals singly or in combination causes the following:

Zero speed results from no signal.

Forward range third speed results from F signal alone.

Forward range second speed results from a combination of F2 signals.

Forward range first speed results from a combination of F1 signals.

Reverse range third speed results from R signal alone.

Reverse range second speed results from R2 signals in combination.

Reverse range first speed results from R1 signals combined.

RATE OF RISE VALVE ASSEMBLY — FIG. 2

In this valve 78, the rail pressure inlet 88 thereto forms a groove about one of a parallel pair of valve bores constituting upper and lower bores 122 and 124 as viewed in FIG. 2. The upper bore 122 reciprocatively receives a coaxial pair of parts constituting a reducing valve 126 and a control piston 128.

The lower bore 124 reciprocatively receives a coaxial pair of parts constituting a sequence valve 130 and a pin or slug 132. The upper and lower bores intercommunicate firstly, through a reducing valve output generally indicated at 134, thence into the direction clutch fill and modulation chamber 96, secondly, through an upper bore groove 136, a cross passage 138, and a lower bore groove 140, thence into the lower bore 124, and thirdly, through the second variable reference chamber 82 forming part of the upper bore 122, a cross passage 142, and a lower bore groove 144, thence into the lower bore 124. An upper bore groove 146 and the second variable reference chamber 82 have an intervening land 148 forming part of the upper bore 122, and the upper bore groove 146 communicates the latter with drain D.

A cylindrical side wall of the reducing valve 126 has four metering orifices 150 communicating with the rail pressure inlet 88 and delivering modulated pressure to the output 134 when the valve is in a metering position with the orifices 150 over the adjacent edge of the groove shaped rail pressure inlet 88. A valve opening spring 152 urges the valve 126 from the metering position to the solid line valve open position as shown in FIG. 2. An end wall of the valve 126 has a coaxial fixed orifice 154 forming a restriction into a back pressure chamber which is generally indicated at 156 and which includes the upper bore groove 136 and that portion of the upper bore 122 between the upper bore grooves 136 and 146. When the reducing valve 126 occupies its extreme metering position, causing the pressure in output 134 to rise linearly so as to have a constant rate of rise, the fixed orifice 154 has a critical function in the control of the small output flow permitted at 134. A minor portion of that output is restrictively admitted by the orifice 154 into the back pressure chamber 156 and the resulting increase of pressure in the chamber 156 augments the valve opening spring 152 to overcome the output pressure at 134 and move the reducing valve 126 to the left as viewed in FIG. 2 in slight amounts always increasing the opening provided by the metering orifices 150 in the reducing valve sidewall. In other words, pressure of the back pressure chamber 156 controls whether or not the rate of rise will occur relatively rapidly or relatively slowly in the clutch cylinders of transmission 28.

Primary and secondary reset springs 158 and 160 for the control piston 128 are arranged with the inner end connected in tandem by means of a common spring seat 162, and with the outer end of the primary reset spring 158 thrusting internally against an end wall of the piston 128 and with the outer end of the secondary reset spring 160 thrusting against an end plate 164 on the casing of valve assembly 78. A cylindrical side wall of the piston 128 has a series of fixed orifices 166, differentiated by subletters, which are progressively graduated in size from small to large in the direction from the left at 166a, to the middle at 166e, thence to the right at 166j as viewed in FIG. 2. Because the intervening land portion 148 of bore 122 is along the path of travel of the control piston 128 as the latter moves from left to right as viewed in FIG. 2, the flow area varies as a decreasing function of the length of the axial control movement of the piston; that is to say, the upper bore drain groove 146 will be a little restricted when orifice 166j registers therewith at outset of the piston stroke, will be more restricted when the fixed orifice 166e registers therewith during further stroke of the piston 128, and will be most restricted when the fixed orifice 166a registers therewith at end of the rightward stroke of the piston 128 as viewed in FIG. 2. Accordingly, pressure will rise in the second variable reference chamber 82 between the restriction 84 and the active ones of the orifices 166 during a rightward stroke of the piston 128. At this time, it is evident that the piston 128 is increasing the volume of the back pressure chamber 156 by a substantial amount, and at the same time is causing the pressure of reference chamber 82 to rise and, consequently, that pressure in the chamber 156 to rise. The reason for increasing the volume 156 is to slow the rate of rise of output at 134 to the desired constant value, and the graded size of the fixed orifices 166 prevent the piston 128, once moving, from unduly accelerating and from causing the pressure rise in output 134 not to be linear.

The sequence valve 130 has the position as shown in solid lines in FIG. 2 in which it can allow clutch fluid to flow in the direction conduit 98 to the exclusion of the speed conduit 106. But in another position, in which cylindrical side wall metering orifices 168 of valve 130 register with the edge of the speed clutch fill and modulation chamber 104, the sequence valve 130 can allow clutch fluid to flow both into the direction conduit 98 and into the speed conduit 106.

Also, the sequence valve 130 controls a bypass land 170 which forms part of the lower bore 124 and which is between the cross passages 138 and 142 in the valve assembly 78. Control of that land 170 and the cross passages 138, 142 determines the stroking and resetting of the control piston 128 in the upper bore 122.

As formed in the sequence valve 130, an annular groove 172 acting alone can bypass the bypass land 170 and the annular groove 172 and radial and longitudinal passages 174 acting in concert can bypass the bypass land 170 in manners shortly to be explained.

As its right end as viewed in FIG. 2, the slug 132 receives the force of a spring seat 176 urged leftwardly by a spring 178, and receives the force of reference pressure in the first constant reference chamber 80. At the left end which protrudes through a lower bore differential pressure chamber 180, the slug 132 receives the force from the output pressure being delivered into the direction conduit 98, and also the force due to the differential pressure across the sequence valve 130, acting on opposite end surfaces of the latter.

Pressure and absence of pressure from the signal lines 40 (FIG. 1) determine the operation of the rate-of-rise valve assembly 78 in the various modes described in the following.

NEUTRAL SIGNAL OF ZERO — FIG. 1

The seated neutral valve 86, as shown in the range selector valve 42 in this figure, prevents any outflow of the incoming rail pressure of the third branch 76; consequently, the neutral valve line 90 between valve 42 and valve 78 is at zero pressure and the rail pressure inlet 88 of the latter valve 78 has the zero pressure indicated at $Po$.

Therefore, the rate-of-rise valve assembly 78 occupies the inactive reset position shown.

SINGLE DIRECTION SIGNAL OF 260 PSI — FIG. 2

Any single direction signal from lines 40, not shown, irrespective of whether there is an accompanying speed signal, is sufficient to open the neutral valve, not shown, pressurizing the neutral valve line 90 and the rail pressure inlet 88 at rail pressure $Pr$ as shown in this figure.

The rate of rise valve assembly 78 is thus set in action, being simultaneously supplied in the first constant reference chamber 80 with the reference pressure P and being supplied in the second variable reference chamber by means of the restriction 84 which is supplied with the same reference pressure P.

EQUILIBRIUM ENGAGED STATE — FIG. 3

In this steady state position shown which the valve assembly 78 takes as the tractor proceeds along in any drive gear, the sequence valve 130 is dynamically held in its intermediate position in the lower bore 124 for metering therein, the control piston 128 is hydraulically held at the end of its control stroke in the upper bore 122, and the reducing valve 126 is spring-held in the valve open position allowing makeup flow from neutral valve line 90 to pass through the valve assembly 78 so as to replenish the selected clutch cylinders of the transmission 28 and thus offset the natural leakage therefrom.

Such makeup flow to the direction conduit 98 takes place through the single restriction of the reducing valve metering orifices 150 causing a first minor pressure drop between rail pressure $Pr$ and the pressure in the output 34 measuring about 20 psi in one physically constructed embodiment of the invention. Makeup flow to the speed conduit 106 takes place through the two restrictions in series formed by metering orifices 150 and 168 causing a second minor pressure drop in totality measuring about 36 psi below rail pressure and about 16 psi below the pressure at output 134 being supplied to the direction conduit 98. Because at equilibrium the fixed orifice 154 in valve 126 equalizes pressure on opposite sides of the end wall of the latter, the unopposed valve opening spring 152 holds the reducing valve 126 in its bottomed valve open position previously referred to.

In equilibrium of the control piston 128, the series of restrictions formed by restriction 84 and the smallest fixed orifices 166a of the orifices 166 establish a pressure in the second variable reference chamber 82 which is slightly more than half of rail pressure, thus creating a pressure differential with pressure in the back pressure chamber 156 by which the control piston 128 is hydraulically held at end of control stroke as described.

In equilibrium of the sequence valve 130, the pressure differential between the pressure of direction conduit 98 and speed conduit 106 applied at opposite ends of valve 130 enables the latter to reach a balanced position against the thrust of the slug 132 which is under mechanical force of the spring 178 and under hydraulic force differential across the slug 132 between the first constant reference chamber 80 and the pressure in valve output 134. In other words, unwanted increasing pressure in the differential chamber 180 and speed conduit 106 hydraulically forces the valve 130 to the left as viewed in FIG. 3 increasing the restriction and pressure drop across the orifices 168; whereas decreasing pressure in chamber 180 and conduit 106 will cause rightward valve balancing movement as viewed in FIG. 3 decreasing the restriction and decreasing the pressure drop caused by the sequence valve metering orifices 168 to restore the balance.

Consequently, the pair of modulated pressure outputs for the pair of clutch groups involved in one physically constructed embodiment of this invention measured 240 psi for full engagement direction-wise e.g., for the R clutch and measured 224 psi for full engagement speed-wise, e.g., for the high speed clutch cylinder 3.

The illustrative operative movements of the sequence valve 130 just mentioned, e.g., rightward movement due to pressure drop in the speed clutch fill and modulation chamber 104, constitute only minor axial adjustment and rebalancing of the valve in its intermediate metering position; whereas any major pressure drop at 104 such as precipitated by a speed clutch change in the same range causes a major inter-positional valve change, for which see the following five consecutive range shift subheads for the various consequences.

RANGE SHIFT SIGNAL — FIG. 4

In a range shift from, say, R 3 to R 2 by a pilot signal changing from rearward high speed to rearward medium speed of the tractor, the range selector valve 42 (not shown) depressurizes the clutch cylinder 3 (not shown) by disconnecting it from the speed conduit 106 in this figure, and reconnects the speed conduit 106 to pressurize the speed clutch cylinder 2 (not shown), first by filling it against practically no resistance. Under a fill pressure dropping toward 40 psi in one physically constructed embodiment of the invention, the clutch cylinder 2 is adequately able to be filled through the speed conduit 106, but at the same time the differential pressure chamber 180 perforce collapses because of the greatly increased pressure differential across the valve 130 moving it into extreme rightward position in chamber 180 as viewed in FIG. 4. The immediate consequence is direction conduit 98 drops to 72 psi being maintained in the clutch cylinder R, and speed conduit 106 drops to a steady 40 psi for fill flow to clutch cylinder 2 at steady pressure.

Simultaneously, the sequence valve groove 172 allows the cross passages 138 and 142 to bypass the bypass land 170 of the lower bore 124, which connects both sides of the control piston 128 across the uncovered land 170.

Two things occur. Drastic reduction of pressure in the valve output 134 enables the practically unopposed valve spring 152 to maintain the valve open position of the reducing valve 126. But at the same time the unopposed tandem springs 158 and 160 expand starting the control piston 128 to reset itself toward the left as viewed in FIG. 4. Thus, fluid volume in the back pressure chamber 156 as augmented by restrictive flow thereinto through the fixed orifice 154 is forced at two points in the upper bore 122 from the left side to the right side of the control piston 128 as viewed in FIG. 4.

RANGE SHIFT RESETTING — FIG. 4

In the period from the time of the range shift pilot signal, just noted, to completion of the fill of clutch cylinder 2 through the speed conduit 106 in this figure, the first portion of that period is utilized by the control piston 128 in making its complete, quick-reset stroke in the left direction as indicated by the arrow shown. That is to say, the open bypass around the piston 128 has its opposite ends, as represented by the cross passages 138 and 142, respectively, intersecting the upper bore 122 at two stroke-end points connected hydraulically adjacent the corresponding opposite ends of the moving piston 128. All fluid contained in chamber 156 between the valve 126 and piston 128 and being displaced by the piston 128 transfers downwardly and then rightwardly as viewed in FIG. 4.

RANGE SHIFT FILLING — FIG. 5

Because the 40 psi filling pressure in speed conduit 106 is communicated to the differential pressure chamber 180, and because the opposite faces of valve 130 are exposed to the 72 psi pressure at output 134 and to the 40 psi pressure in differential pressure chamber 180, the sequence valve 130 assumes a regulating function at the variable restriction formed between a sequence valve fill edge 182 and the adjacent side of the speed clutch fill and modulation chamber 104. So the valve 130, thus balanced against the bias of the thrust of slug 132 will continually maintain fill flow in the speed conduit 106 at about 40 psi in one physically constructed embodiment of the invention.

Meantime, however, continued uncovering of the bypass land 170 by the sequence valve groove 172 enables the tandem springs 158 and 160 to give the control piston 128 in its illustrated position a full resetting as noted, ready for the next cycle. A minor portion of the flow from neutral valve line 90 in FIG. 5 passes through the rail pressure inlet 88, the metering orifices 150, the fixed orifice 154, the collapsed back pressure chamber 156, cross passage 138, sequence valve annular groove 172, cross passage 142, chamber 82, and upper bore groove 146, thence directly to the sump source 32 through drain D. The selected direction clutch, e.g., clutch cylinder R, remains filled throughout the speed clutch change. The selected speed clutch cylinder e.g., cylinder 2, is filled at a pressure which cannot start to rise until the filling is completed, because the filling permits no rise of pressure in differential pressure chamber 180.

RANGE SHIFT MODULATION STARTING — FIG. 6

It would otherwise be the case, with the selected direction clutch remaining filled and at point of completion of fill of the selected speed clutch, that the pressure would then rapidly rise to full engagement pressure, except for the coordinated action at that point of the valves 126 and 130, and control piston 128. In one physically constructed embodiment of the invention however, just as soon as pressure abruptly arose to 95 psi in output 134 and to 62 psi in speed clutch fill and modulation chamber 104 and differential pressure chamber 180, the valve 126 and piston 128 moved slightly rightwardly from their respective fully open and reset positions to the positions as shown in FIG. 6 and the valve 130 moved from its previously described fill edge position leftwardly to the modulating position as shown in FIG. 6.

The reason is that the output pressure of 95 psi represents a 23 psi pressure rise causing the valve 126 to move itself and the control piston 128 therewith to a position at which the reducing valve metering orifices 150 establish cooperation with the right edge of the rail pressure inlet 88 for modulating the pressure rise. The speed chamber pressure at 104 and the differential pressure in chamber 180 of 62 psi represent a 22 psi pressure rise causing the sequence valve 130 to move into a position in which the metering orifices 168 establish cooperation with the left side of the speed clutch fill and modulating chamber 104 for modulating speed clutch pressure rise.

Moreover, the sequence valve annular groove no longer uncovers the bypass land 170, and the control piston bypass is blocked between its end points and so is the outlet for the fixed orifice 154 in the end wall of the reducing valve 126. So the resulting restricted flow through the fixed orifice 154 will cause the already initially moved, control piston 128 to continue with a control stroke, to the right as viewed in FIG. 6.

RANGE SHIFT MODULATION UNDERWAY — FIG. 7

This figure shows the valves 126 and 130 and control piston 128 in their proper position modulating rate of clutch pressure rise at an intermediate point in the control stroke of the piston 128. While in theory practically no flow to the clutches would be required simply in raising their pressure roughly 200 psi from the fill pressure level to the fully engaged pressure level, it will be appreciated that due to normal leakage flow in both clutch cylinders selected, a low but steady, make-up flow will be permitted by the valve assembly 78 to the clutches during the modulated pressure rate of rise therein.

The reducing valve 126 in the illustrated position is continuing to raise the pressure in the output 134 and, at this point as above referred to, the reducing valve metering orifices 150 have the output pressure reduced about 90 psi below rail pressure Pr in the inlet 88. The sequence valve 130 is continuing to increase pressure in the speed conduit 106 and the sequence valve metering orifices 168 at this point have the pressure at 104 reduced about 21 psi below the pressure at the valve output 134.

Meantime, the coordinated action of the fixed orifice 154 and moving piston 128 have the pressure of back pressure chamber 156 approximately 44 psi below pressure at output 134 and approximately 49 psi above the pressure of chamber 82 being exerted inside the control piston 128. The latter pressure of course is established dependent upon the rate at which the fixed orifice 166e and others adjacent dispose of the combined flow to drain coming from piston displacement and inflow under the rail pressure entering through the restriction 84 in the valve assembly end plate 164. That is to say, as the control piston 128 moves rightward the effective restriction of the graduated orifices 166 increases with respect to the restriction of end plate orifice 84. So the pressure in reference chamber 82 rises, causing the pressure in back pressure chamber 156 to rise and to act stronger against the reducing valve 126. Such progressively increasing back pressure on the reducing valve 126 brings about a raising of pressure in the selected direction clutch cylinder, e.g., cylinder R, until the equilibrium condition illustrated in FIG. 3 is ultimately reached.

The differential pressure force on the opposite ends of sequence valve 130, facing the pressure one way of output 134 and the other way the differential pressure chamber 180, is sufficient to balance the sequence valve in modulating position against leftward thrust of the slug 132.

The modulated pressure rate of rise continues until the valves and piston 128 of the assembly 78 reach the previously discussed steady state position as illustrated in preceding FIG. 3. The cycle of steps is then repeated upon the next speed clutch shift, including the steps of resetting the control piston 128 to the left as viewed in FIG. 7 and effecting the control stroke of the piston 128 to the right as viewed in FIG. 7.

DIRECTION SHIFT RESETTING — FIG. 8

In their effect upon the valve assembly 78, the speed shift as illustrated in preceding FIG. 4 and the direction shift as illustrated in FIG. 8 differ in the respect that sequence valve 130 does not take the partway-moved fill position for speed shift as illustrated in FIG. 4, but rather its full-left fill position as illustrated in FIG. 8 for the direction clutch shift. In other words, the valve assembly 78 is not encountering an already filled direction clutch but rather, when encountering a shift from, say, the R cylinder to the F clutch cylinder, the valve 78 fills the direction clutch cylinder F under comparitively low pressure, e.g., 32 psi in one physically constructed embodiment of the invention. Under such low pressure in the valve output 134 as the flow therefrom starts filling the forward clutch cylinder F, the pressure differential exerted across sequence valve 130 is unable to balance the thrust of slug 132 which moves the valve 130, as indicated, to the full left position as viewed in FIG. 8.

It is only after fill of the clutch cylinder F through the direction conduit 98 that pressure in the output 134 can begin to rise above 32 psi. And meantime, the sequence valve 130 in full left position introduces another bypass route about the bypass land 170, with the fluid flowing from the back pressure chamber 156 in a path leading through the crosspassage 138, sequence valve annular groove 172, radial and longitudinal valve passages 174, differential pressure chamber 180, crosspassage 142, the second variable reference chamber 82, the less-restricted fixed orifice 166e and associated orifices 166, and upper bore groove 146, thence into drain D to the sump source. Accordingly, flow through the orifice 154 to the right is against substantially zero pressure and the spring-resetting movement of the piston 128 as indicated by the arrow to the left as viewed in FIG. 8 is against practically zero pressure.

DIRECTION SHIFT FILLING UNDERWAY — FIG. 9

After the fast left stroke of control piston 128 marking its quick reset, the reducing valve flow in its output 134 continues to the direction conduit 98 under 30 psi pressure, and bypass flow around the bypass land 170 continues so that pressure remains at zero pressure in the back pressure chamber 156 and in the second variable reference chamber 82.

Figure 9:
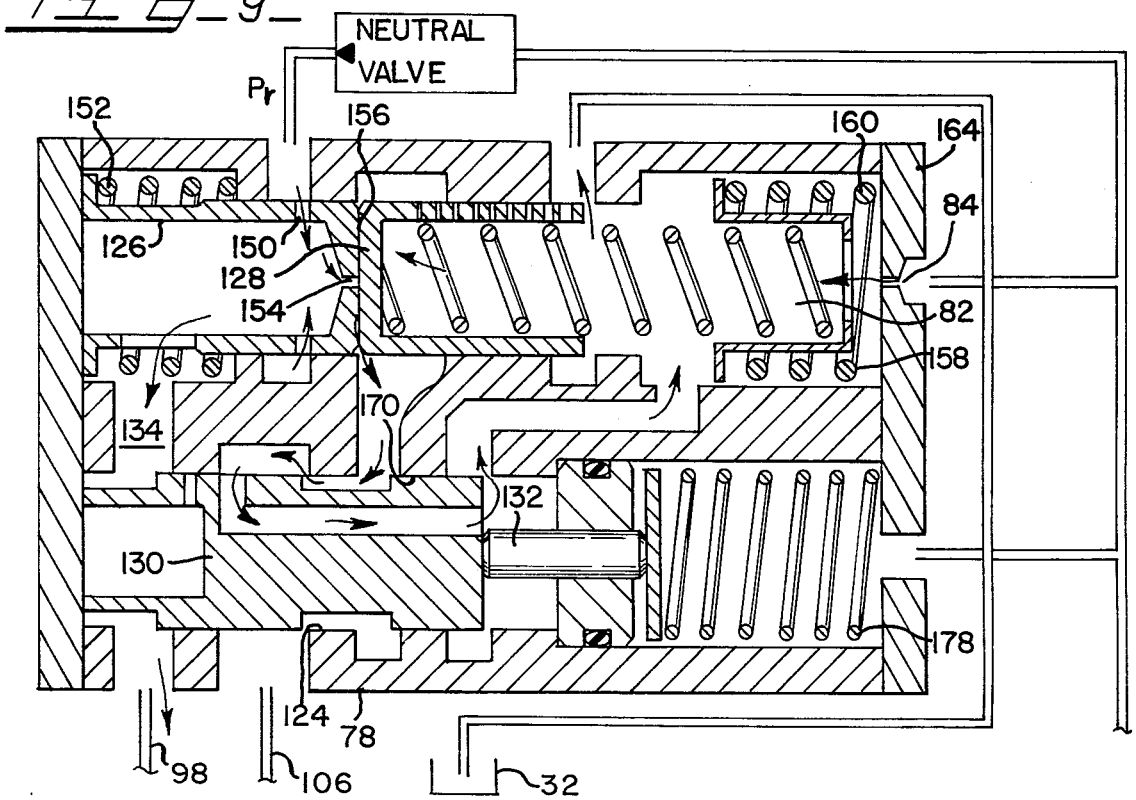

Filling continues in direction conduit 98 until completed, wherefrom there is an abrupt, 40 psi rise of pressure to 72 psi in the direction conduit 98, exerting a pressure differential causing the sequence valve 130 to snap rightwardly from the position as shown in FIG. 9 into its partway moved position to the right as shown in solid lines in FIG. 7.

DIRECTION SHIFT MODULATING UNDERWAY — FIG. 7

In such partway-moved position as illustrated in this figure, the sequence valve 130 positions its metering orifices 168 in a position reducing the 72 psi pressure from output 134 to a constant 40 psi in one physically constructed embodiment of the invention so that the speed clutch fill and modulation chamber 104 will deliver speed clutch flow into the speed circuit 106 for filling the selected speed clutch, e.g., clutch cylinder 1, not shown. Speed clutch filling continues as before according to the previous description of FIG. 7 until there is an abrupt rise to 62 psi in speed conduit 106, whereafter the modulated constant pressure rise for engaging both clutches ensues in the previously described manner.

These modulated constant pressure rises for engaging both clutches produce pressure traces that appear as diagonally upward, constant slope, straight line curves on a graph. In respect of the direction conduit 98, the reason is that the pressure drop across valve orifice 154 during modulation is automatically kept constant, and so the rate of flow of fluid through the orifice 154 stays constant. The control piston 128 therefore moves at constant speed throughout each control stroke (to the right as viewed in FIG. 7). In respect of the speed conduit 106 supplied from the output 134 through the sequence valve modulating orifices 168, the speed conduit pressure always follows along, with but below, the output and direction conduit pressure, necessarily as a function of the latter throughout modulation. The pressure in the speed conduit, however, is enabled to rise along a slightly steeper sloped, straight line on a graph because of significant action of the slug 132, as will shortly be explained.

Upon tractor startup, a shift from neutral to a gear in either speed range produces the same sequence of events in valve assembly 78 as just outlined in connection with the illustrations of FIGS. 9 and 7, taken in that order.

It is significant during modulated pressure rise for fully engaging the selected direction clutch and speed clutch, that the difference pressure across the slug 132, FIG. 7, decreases at constant rate as the direction and speed clutch cylinder pressure linearly increase. Hence, the speed pressure will tend to approach the direction pressure, i.e., the two linear pressure curves converge, but without intersecting on a pressure trace as will now be seen.

SPEED SHIFT PRESSURE TRACE — FIG. 10

Preparatory to speed clutch shift, when the direction clutch pressure curve 184 holds steady above and parallel to the speed clutch pressure curve 186, the difference was about 16 psi in one physically constructed embodiment of the invention. A speed shift caused the direction clutch pressure to drop abruptly to 72 psi according to the curve at its flat portion 188 at which the direction clutch remained filled, whereas the pressure abruptly dropped in the speed clutch selected to 40 psi according to the flat portion 190 of the speed curve, indicative of the selected speed clutch undergoing constant pressure filling. Only leakage flow occurred in the direction clutch cylinder at that time.

Following filling of the speed clutch, an abrupt rise of pressure in both curves to their respective direction knee at 192 and speed knee at 194 brings the direction clutch pressure to 95 psi and the speed clutch pressure to 65 psi, a differential of 30 psi in one physically constructed embodiment of the invention. Thereafter, in completing the cycle back to steady state position, the rate-of-rise valve assembly causes the pressures to rise diagonally linearly, each at constant rate-of-rise in converging relationship to the steady state condition described.

DIRECTION SHIFT PRESSURE TRACE — FIG. 11

During a directional shift either from neutral or from the opposite direction, the direction curve has a first flat portion 196 at which the selected direction clutch is being filled at 32 psi to the exclusion of the speed clutch, and a second flat portion 198 at which filled selected direction clutch is maintained at 72 psi with sufficient flow thereto only to make up for leakage in the direction clutch. During the latter phase, the speed curve has a flat portion 200 during a period in which it is being filled to the exclusion of the direction clutch and at a pressure of 40 psi.

Thereafter, during the abrupt rise to the respective direction knee at 202 and the speed knee 204 and thereafter along the modulated rise trace, the direction clutch pressure curve and the speed clutch pressure curve have the identical relationship already described in connection with FIG. 10.

From the foregoing discussion of the pressure traces, and with particular reference to FIG. 9, it can be seen from the critical position of fixed orifice 154 in the reducing valve 126, that reducing the orifice 154 in size will cause the total pressure rise time to be increased, and vice versa, because slowing the motion of controlled piston 128 causes a showing of the modulated pressure rise. It will be appreciated from the critical position of restriction 84 in the valve assembly end plate 164 that increasing the restriction 84 in size will cause the straight sloping portions of the pressure curves to increase in their straight slope angle, and vice versa, because of the greater rapidity of rise of pressure, relatively speaking, in the chamber 82.

It will be noted from the critical placement of the reducing valve metering orifices 150 that changing the number, size, and positional arrangement of the orifices 150 wil cause the shapes of the pressure trace curves to be modified.

It will be apparent from the critical placement of a slug 132 in lower bore 124, that decreasing the cross sectional size of the slug 132 will decrease the differential in pressure of the selected direction clutch above the pressure of the speed clutch, and vice versa. It will be appreciated from the critical placement of the springs 152, 158, 160 and 178, that by changing the initial spring forces of one or a combination of those springs the initial pressures along the pressure curves can be changed. Also, an increase of strength of the reducing valve spring 150 will reduce the diagonal slope and increase time for the modulation cycle on the graph, and vice versa. Thus a wide variation of pressure curves is obtainable with minor mechanical variations herein.

The signifcance of the foregoing noted feature whereby the difference between direction and speed clutch pressure is large at low pressure and decreases to a small value at high pressure, is that the two selected clutches are properly phased in the transmission as they slip simultaneously. The significance of filling the directional clutch and giving it higher pressure first according to the sequence compared to the selected speed clutch has to do with the direction clutch being actually a high speed clutch necessarily requiring a head start in engaging with respect to the sequence of engagement of the speed clutch. The significance of the positive quick reset mechanism afforded by the automatic control piston 128 is to insure that the control piston resets during a shift, and the modulation does not start prior to completion of filling of both selected clutches.

Variations within the spirit and scope of the invention described are equally comprehended by the foregoing description.

What is claimed is:

1. In transmission hydraulic controls mechanism wherein speed and direction clutch systems are provided, both disposed to receive modulated actuating hydraulic fluid, a valve assembly comprising:

a reducing valve disposed to receive actuating main rail hydraulic fluid, said reducing valve having a fluid output wherein the pressure of the fluid at the output is reduced at a range below main rail pressure;

a control piston associated with the reducing valve for increasing the actuating pressure of the fluid at the reducing valve output, with said increase at constant rate;

a valve bore in the assembly common to the valve and piston and coaxially slidably receiving same;

said assembly provided with an internal bypass around the piston including a bypass land and means affording therepast bypass-blocked and direct bypass-open conditions, and having its opposite ends intersecting the bore at two points disposed hydraulically adjacent the respective opposite ends of the piston;

first means connected hydraulically to said bore effective during the bypass-blocked condition to introduce restricted flow of output fluid between the valve and piston to hydraulically cause relative separative movement therebetween from a reset position of the piston adjacent the valve;

second means effective during the bypass-blocked condition for introducing resistance to relative separative movement by the piston, controlling speed of the latter and building up valve back pressure between the valve and piston; and third means connected to the piston effective during the direct bypass-open condition so as to cause the piston to quickly reset to reset position by direct replenishment of the volume evacuated therebehind, with that fluid being immediately displaced ahead of the piston;

said coaxially slidably related valve and piston defining an intervening valve back pressure space in said common bore on the relatively adjacent side of the piston, said valve and piston being hydraulically connected by the fluid in said space;

said third means comprising a reset spring (158) connected to the piston on its relatively nonadjacent side.

2. In transmission hydraulic controls mechanism wherein speed and direction clutch systems are provided, both disposed to receive modulated actuating hydraulic fluid, a valve assembly comprising:

a reducing valve disposed to receive actuating main rail hydraulic fluid, said reducing valve having a fluid output wherein the pressure of the fluid at the output is reduced at a range below main rail pressure;

a control piston associated with the reducing valve for increasing the actuating pressure of the fluid at the reducing valve output, with said increase at constant rate;

a valve body in the assembly common to the valve and piston and coaxially slidably receiving same;

said assembly provided with an internal bypass around the piston characterized by a bypass land (170) and means (172) affording therepast bypass-blocked and direct bypass-open conditions, and having its opposite ends intersecting the bore at two points disposed hydraulically adjacent the respective opposite ends of the piston;

first means connected hydraulically to said bore effective during the bypass-blocked condition to introduce restricted flow of output fluid between the valve and piston to hydraulically cause relative separative movement therebetween from a reset position of the piston adjacent the valve;

second means effective during the bypass-blocked condition for introducing resistance to relative separative movement by the piston, controlling speed of the latter and building up valve back pressure between the valve and piston; and third means connected to the piston effective during the direct bypass-open condition so as to cause the piston to quickly reset to reset position by direct replenishment of the volume evacuated therebehind, with that fluid being immediately displaced ahead of the piston.

3. In transmission hydraulic controls mechanism wherein speed and direction clutch systems are provided, both disposed to receive modulated actuating hydraulic fluid, a valve assembly comprising:

a reducing valve disposed to receive actuating main rail hydraulic fluid, said reducing valve having a fluid output wherein the pressure of the fluid at the output is reduced at a range below main rail pressure;

a control piston associated with the reducing valve for increasing the actuating pressure of the fluid at the reducing valve output, with said increase at constant rate;

a valve bore in the assembly common to the valve and piston and coaxially slidably receiving same;

said assembly provided with an internal bypass around the piston characterized by a bypass land and means affording therepast bypass-blocked and direct bypass-open conditions, and having its opposite ends intersecting the bore at two points disposed hydraulically adjacent the respective opposite ends of the piston;

first means connected hydraulically to said bore effective during the bypass-blocked condition to introduce restricted flow of output fluid between the valve and piston to hydraulically cause relative separative movement therebetween from a reset position of the piston adjacent the valve;

said coaxially slidably related valve and piston defining an intervening valve back pressure chamber in said common bore;

said first means comprising a restriction (154) in the reducing valve intercommunicating the output and said valve back pressure chamber for causing the relative separative movement hydraulically as described;

second means effective during the bypass-blocked condition for introducing resistance to relative separative movement by the piston, controlling speed of the latter and building up valve back pressure between the valve and piston; and third means connected to the piston effective during the direct bypass-open condition so as to cause the piston to quickly reset position by direct replenishment of the volume evacuated therebehind, with that fluid being immediately displaced ahead of the piston.

4. In transmission hyraulic controls mechanism wherein speed and direction clutch systems are provided, both disposed to receive modulated actuating hydraulic fluid, a valve assembly comprising:

a reducing valve disposed to receive actuating main rail hydraulic fluid, said reducing valve having a fluid output wherein the pressure of the fluid at the output is reduced at a range below main rail pressure;

a control piston associated with the reducing valve for increasing the actuating pressure of the fluid at the reducing valve output, with said increase at constant rate;

a valve bore in the assembly common to the valve and piston and coaxially slidably receiving same:

said assembly provided with an internal bypass around the piston including a bypass land and means affording therepast bypass-blocked and direct bypass-open conditions, and having its opposite ends intersecting the bore at two points disposed hydraulically adjacent the respective opposite ends of the piston;

first means connected hydraulically to said bore effective during the bypass-blocked condition to introduce restricted flow of output fluid between the valve and piston to hydraulically cause relative separative movement therebetween from a reset position of the piston adjacent the valve;

second means effective during the bypass-blocked condition for introducing resistance to relative separative movement by the piston, controlling speed of the latter and building up valve back pressure between the valve and piston, and comprising a drain port intersecting said bore intermediate said two points so as to lie along the path of sliding of the piston;

said piston having spill orifices (166) of graduated size along the side thereof, having decreasing size as they encounter the drain port during said relative separative movement of the piston from reset position; and passage means (84) to introduce a body of fluid incoming into said bore ahead of the piston and not trapped because of its restrictive escape afforded by the piston itself through its spill orifices aforesaid.

* * * * *